United States Patent

Aoyama et al.

[11] Patent Number: 5,765,659
[45] Date of Patent: Jun. 16, 1998

[54] DIRIGIBLE DRIVE WHEEL ASSEMBLY

[75] Inventors: Hitoshi Aoyama; Kenzo Ushiro, both of Sakai, Japan

[73] Assignee: Kubota Corporation, Japan

[21] Appl. No.: 638,485

[22] Filed: Apr. 26, 1996

[30] Foreign Application Priority Data

Apr. 27, 1995 [JP] Japan ................................. 7-103601

[51] Int. Cl.⁶ .................................................. B60K 17/30
[52] U.S. Cl. .................................................. 180/261
[58] Field of Search ................................. 180/231, 253, 180/261, 262, 260

[56] References Cited

U.S. PATENT DOCUMENTS

| | | | |
|---|---|---|---|
| 4,301,886 | 11/1981 | Kinoshita et al. | 180/261 |
| 4,553,624 | 11/1985 | Yoshii | 180/261 |
| 4,609,065 | 9/1986 | Shikiya | 180/261 |
| 4,798,260 | 1/1989 | Nakata | 180/253 |

FOREIGN PATENT DOCUMENTS

| | | |
|---|---|---|
| 2-23223 | 2/1990 | Japan . |
| 2128948 | 5/1984 | United Kingdom . |

*Primary Examiner*—Stephen Avila
*Attorney, Agent, or Firm*—Webb Ziesenheim Bruening Logsdon Orkin & Hanson, P.C.

[57] ABSTRACT

A dirigible drive wheel assembly includes a transmitting and steering shaft extending approximately vertically, with an axis thereof inclined, for drivably connecting an axle of a wheel to a transmission shaft, a first driving gear disposed in a lower end region of the transmitting and steering shaft, a first driven gear mounted on the axle and meshed with the first driving gear, a second driven gear disposed in an upper end region of the transmitting and steering shaft, a second driving gear mounted on the transmission shaft and meshed with the second driven gear, a second gear case for covering the second driving gear and the second driven gear, and a first gear case for covering the first driven gear and the first driving gear. A first bearing is disposed between the first gear case and a lower end of the second gear case. Through the first bearing the lower end of the second gear case is rotatably supported by the first gear case. An arm extends from the first gear case for holding an upper end of the second gear case to be rotatable about the axis. A second bearing and a third bearing are arranged at opposite sides of the first driven gear, through which the first gear case is rotatably supported by the axle. The third bearing is located below the first bearing.

5 Claims, 3 Drawing Sheets

DIRIGIBLE DRIVE WHEEL ASSEMBLY

BACKGROUND OF THE INVENTION

The present invention relates to a dirigible drive wheel assembly for receiving drive from a transmission shaft, the assembly including a drive transmission for drivably connecting an axle of a wheel to the transmission shaft to transmit the drive to the wheel.

A known dirigible drive wheel assembly of this type is disclosed in the Japanese utility model application laid open under No. 2-23223 or U.S. Pat. No. 4,609,065, for example. In the known assembly, the drive transmission includes a transmitting and steering shaft extending approximately vertically, with an axis thereof inclined, a first driving gear disposed in a lower end region of the transmitting and steering shaft, a first driven gear mounted on the axle and meshed with the first driving gear, a second driven gear disposed in an upper end region of the transmitting and steering shaft, and a second driving gear mounted on the transmission shaft and meshed with the second driven gear. The drive transmission further includes a second gear case for covering the second driving gear and the second driven gear, and a first gear case for covering the first driven gear and the first driving gear. The second gear case partly projects into the first gear case, and is rotatably supported by the first gear case through two, upper and lower, ball bearings. With this construction, drive is transmitted from the transmission shaft to the transmitting and steering shaft through the second driving gear and second driven gear. Then, the drive is transmitted from the transmitting and steering shaft to the axle through the first driving gear and first driven gear, to drive the wheel. Since the second gear case is rotatably supported by the first gear case, the wheel is steered about the axis of the transmitting and steering shaft.

Such a dirigible drive wheel assembly is used mainly on a tractor. In the field of tractors, it has been required to reduce a radius of turning to improve operating efficiency. For this purpose, the technique of making a turn while braking rear wheels lying inwardly during the turn, i.e. a brake turn, or while accelerating the front wheels to rotate faster than the rear wheels, have been put to practical use. However, to utilize such a technique more effectively, it has been increasingly important to enlarge the steering angle of the front wheels which are dirigible drive wheels.

To enlarge a maximum steering angle of the dirigible drive wheels, it is effective to reduce a spacing (i.e. so-called scrub radius) between a point at which a lower extension of the axis of the transmitting and steering shaft intersects the ground and the center of ground engaging point of each front wheel. The scrub radius may be reduced by placing the transmitting and steering shaft inside the dirigible drive wheel or by inclining the transmitting and steering shaft to a greater degree. However, if the transmitting and steering shaft is inclined excessively, steering of the wheels raises the tractor body to an excessive level, resulting in a heavy steering operation, or produces excessive camber variations, which are undesirable. Further, in the known dirigible drive wheel assembly noted above, it has been difficult to place the transmitting and steering shaft inwardly of the dirigible drive wheel particularly because of the question of space in the first gear case for arranging the two ball bearings through which the second gear case is rotatably supported by the first gear case.

SUMMARY OF THE INVENTION

The object of the present invention is to provide a dirigible drive wheel assembly of the type noted in the outset hereof, which is improved to realize an increased steering angle.

The above object is fulfilled, according to the present invention, by a dirigible drive wheel assembly comprising a drive transmission for drivably connecting an axle to a transmission shaft, the drive transmission including a transmitting and steering shaft extending approximately vertically with an axis thereof inclined, a first driving gear disposed in a lower end region of the transmitting and steering shaft, a first driven gear mounted on the axle and meshed with the first driving gear, a second driven gear disposed in an upper end region of the transmitting and steering shaft, and a second driving gear mounted on the transmission shaft and meshed with the second driven gear; a second gear case for covering the second driving gear and the second driven gear; a first gear case for covering the first driven gear and the first driving gear; a first bearing through which the second gear case is supported at a lower end thereof by the first gear case to be rotatable about the axis; an arm extending from the first gear case for holding an upper end of the second gear case to be rotatable about the axis; and a second bearing and a third bearing arranged at opposite sides of the first driven gear, through which the first gear case is rotatably supported by the axle; wherein the third bearing is located below the first bearing.

According to this construction, the third bearing for supporting the axle is located below the first bearing for supporting the second gear case. Consequently, the transmitting and steering shaft lies closer to the axle than in the prior art, thereby to reduce the scrub radius noted hereinbefore. With this construction, although the first bearing is at a higher level than in the prior art, the arm extending from the first gear case holds the upper end of the second gear case, whereby the second gear case is reliably and steadily received by the first gear case.

In a preferred embodiment of the invention, the third bearing is located between the transmitting and steering shaft and a line extending through a center of meshing between the first driven gear and the first driving gear and perpendicular to the axle. This construction is free from the drawback of the meshing point overhanging the third bearing as encountered in the conventional construction. It is therefore unnecessary to increase the rigidity of the first driven gear.

Preferably, the second driven gear is mounted on the transmitting and steering shaft to mesh with a lower position of the second driving gear. With this construction, the second gear case projects upward only to a limited level while securing a sufficient height of the transmission shaft above the ground. Consequently, the arm need not extend upward to a high level from the first gear case. This feature secures a sufficient space between the arm and a rim portion of the wheel to contribute toward an increased maximum steering angle of the dirigible drive wheel.

In a further embodiment of the invention, the first gear case defines an opening for receiving a lower end of the second gear case, the lower end of the second gear case being located above an axis of the axle, the first gear case defining a space therein for receiving a large part of the transmitting and steering shaft and the first driving gear. In this construction, the second gear case is held by the first bearing and the arm, avoiding a double tube construction of the first gear case and second gear case formed by inserting the second gear case past the opening into a depth of the first gear case as seen in the prior art. This feature allows the transmitting and steering shaft to be still closer to the axle.

In a still further embodiment of the present invention, the axle is attachable by insertion from outside the wheel through the second bearing to the third bearing, the axle being retained in place by a snap ring interposed between the first driven gear and the axle. With this construction, the axle hardly projects from the third bearing toward the transmitting and steering shaft, compared with a case where a snap ring is mounted at an inward end of the axle. This feature allows the transmitting and steering shaft to be still closer to the axle.

Other features and advantages of the present invention will be apparent from the following description of the preferred embodiment to be taken with reference to the drawings.

DETAILED DESCRIPTION OF THE PREFERRED EMBODIMENT

An embodiment of the present invention will be described hereinafter, in which dirigible drive wheels are used as front wheels of a four wheel drive tractor.

Figure 1:
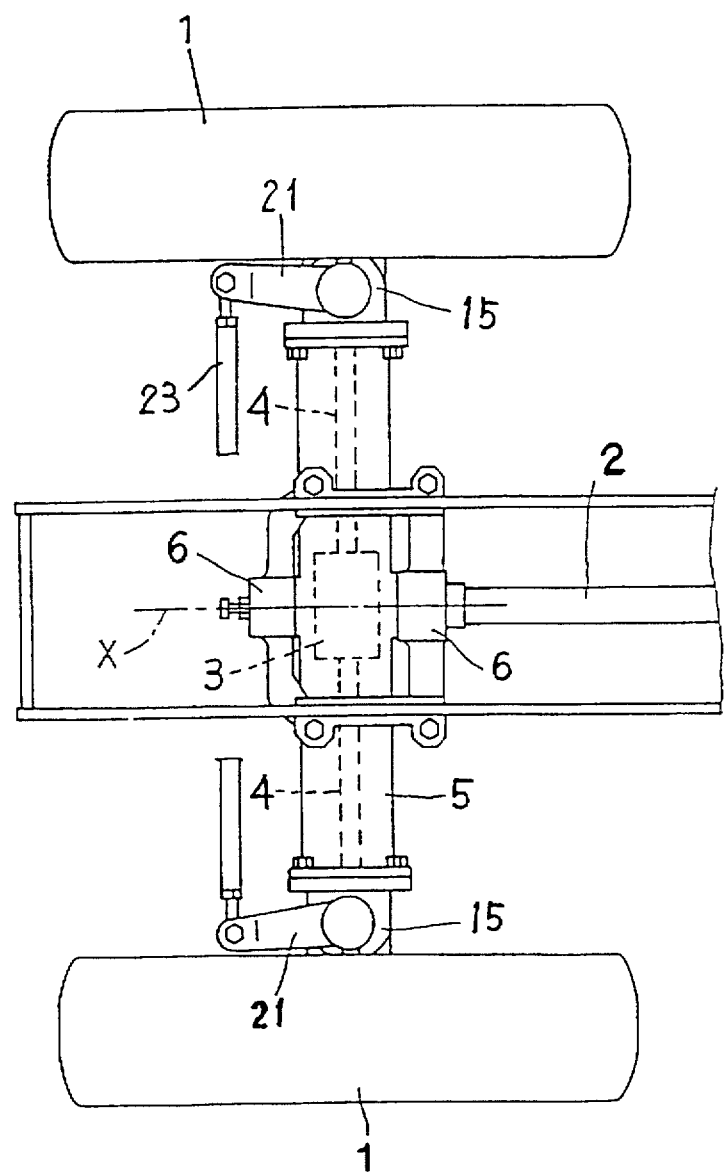
FIG. 1 is a schematic plan view of a front wheel region of a tractor employing dirigible drive wheels according to the present invention.
Figure 2:
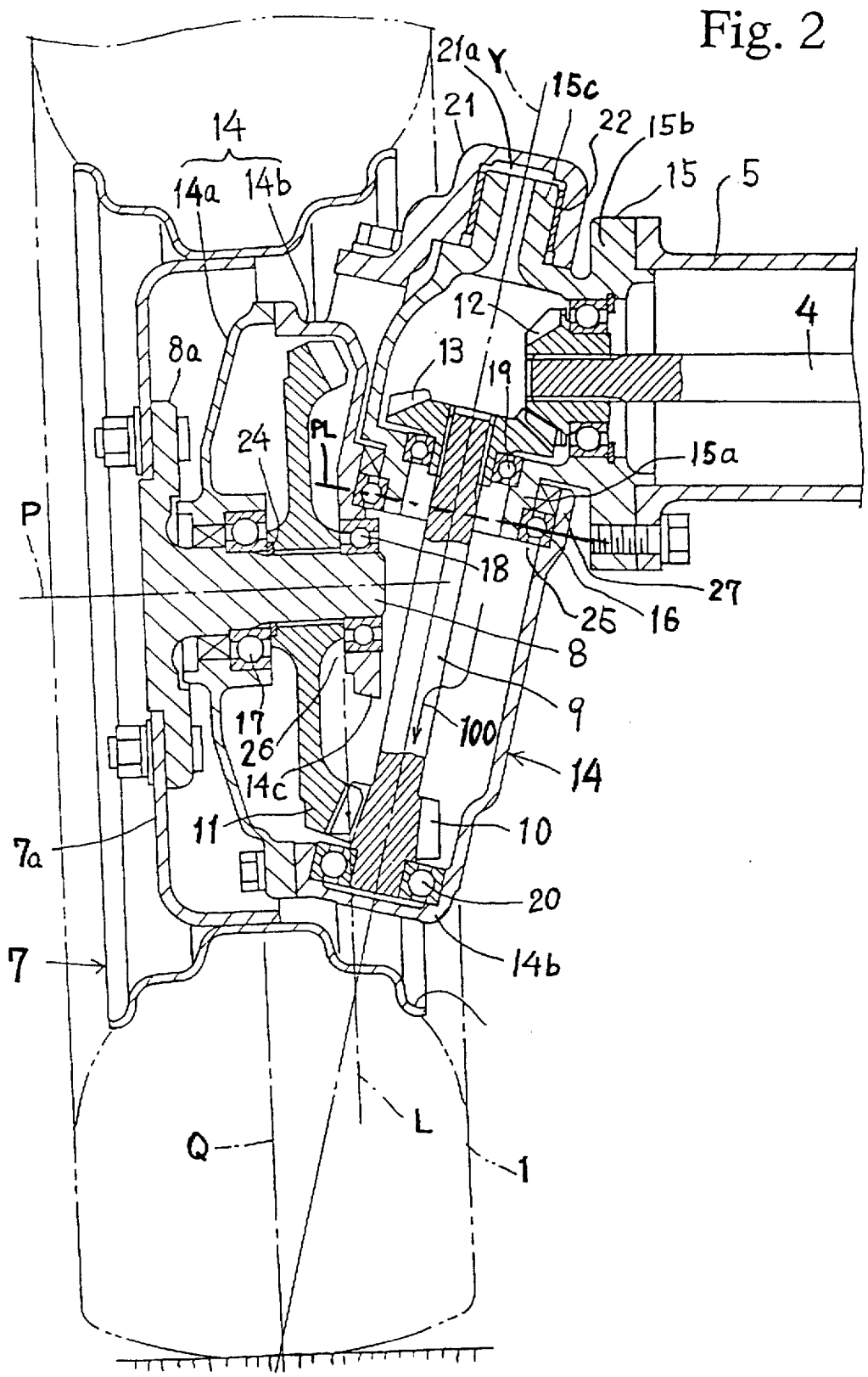
FIG. 2 is a sectional view of a front wheel shown in FIG. 1.

FIG. 1 is a plan view of a front wheel region of a tractor showing, for facility of illustration, only those components relating to steering and driving of right and left front wheels 1. A front wheel drive shaft 2 receives drive from an engine not shown, through a transmission also not shown. The front wheel drive shaft 2 is connected to a front wheel differential 3. A pair of right and left transmission shafts 4 extend transversely of a tractor body to act as outputs of the differential 3. The differential 3 and transmission shafts 4 are mounted in an axle case 5. The axle case 5 is attached to the tractor body to be oscillatable about a longitudinal axis X. Two bevel gear mechanisms are used for drive transmission from the transmission shafts 4 to the front wheels 1 and for steering of the front wheels 1. FIG. 2 shows a construction of one bevel gear mechanism. The right and left front wheels 1 have the same construction, and therefore only one of the front wheels 1 will be described.

The front wheel 1 includes a wheel 7 having a disc portion 7a bolted to a flange 8a of an axle 8. The axis P of the axle 8 forms a rotational axis of the front wheel 1. A drive transmitting device drivably connects the axle 8 to one of the transmission shafts 4. This device includes a transmitting and steering shaft 9 having an axis Y at an angle to a centerline Q extending perpendicular to a ground engaging plane of the front wheel 1, a first driving bevel gear 10 formed integrally with a lower end region of the transmitting and steering shaft 9, a first driven bevel gear 11 splined to the axle 8 and meshed with the first driving bevel gear 10, a second driven bevel gear 13 splined to an upper end of he transmiting and steering shaft 9, and a second driving bevel gear 12 splined to an end of the transmission shaft 4 and meshed with the second driven bevel gear 13. The transmitting and steering shaft 9 is positioned such that the second driven bevel gear 13 is meshed with a lower position of the second driving bevel gear 12.

A first gear case 14 houses a large part of the first driving bevel gear 10, first driven bevel gear 11 and transmitting and steering shaft 9. A second gear case 15 covers the second driving bevel gear 12 and second driven bevel gear 13. The first gear case 14 includes an outer case portion 14a disposed adjacent the wheel 1, and an inner case portion 14b disposed inwardly of the tractor body, the two case portions being interconnected by bolts. The outer case portion 14a defines a vertical opening 26 for receiving the axle 8. The inner case portion 14b defines a sideways opening 25 for receiving the transmitting and steering shaft 9. The second gear case 15 has a lower end 15a thereof fitted in the sideways opening 25, and is received in a tubular portion 27 of the inner case portion 14b to be oscillatable about axis Y through a first bearing 16. With the lower end 15a of the second gear case 15 terminating at the first bearing 16, the second gear case 15 hardly projects into the inner case portion 14b. The inner case portion 14b defines a space therein for receiving a large part of the transmitting and steering shaft 9 and the first driving gear 10. Thus, the transmitting and steering shaft 9 is inserted along with the first driving gear 10 into the inner case portion 14b, describing a locus as indicated by an arrow 100. When assembled in this way, the lower end 15a of the second gear case 15 lies above the axis P of the axle 8. Explained differently, the third bearing 18 is below a plane PL which is perpendicular to the axis Y of the transmitting and steering shaft 9 and extends through the first bearing 16. The second gear case 15 includes a flange 15b defining an opening for receiving the transmission shaft 4. Through this flange 15b the second gear case 15 is bolted to the axle case 5.

The first gear case 14 is relatively rotatably mounted on the axle 8 through a second bearing 17 disposed outwardly of the first driven bevel gear 11 and a third bearing 18 disposed inwardly of the first driven bevel gear 11. The third bearing 18 is attached to an intermediate wall 14c depending from an upper position of the inner case portion 14b. Part of the first bearing 16 is attached to the wall 14c above the third bearing 18. With the third bearing 18 fitted below the first bearing 16, the first driven bevel gear 11 is disposed close to the transmitting and steering shaft 9, thereby achieving a reduction in the width of the first gear case 14. This feature contributes to realizing a construction in which the first gear case 14, or the transmitting and steering shaft 9, lies inside a rim portion 7b of the wheel 7 in order to enlarge a maximum steering angle of the front wheel 1.

The transmitting and steering shaft 9 is supported by the second gear case 15 through a small bearing 19 disposed in a region of connection with the second driven bevel gear 13. Further, the transmitting and steering shaft 9 is supported by the inner case portion 14b through a large bearing 20 disposed at a lower end thereof.

A knuckle arm 21 is bolted to and extends upward from an upper position of the inner case portion 14b. The knuckle arm 21 defines a holding recess 21a for relatively rotatably holding a shaft portion 15c formed at an upper end of the second gear case 15. The knuckle arm 21 and the shaft portion 15c of the second gear case 15 are in fitting engagement with each other through a bush 22. Thus, the second gear case 15 is rotatably and stably supported by the first gear case 14 through the first bearing 16 and bush 22. As shown in FIG. 1, a tie rod (or drag link) 23 is pivotally connected to knuckle arms 21 to transmit movement of a steering wheel to steer the front wheels 1.

A snap ring 24 is attached to splines of the axle 8 engaging the first driven bevel gear 11, to act on the second bearing 17. The snap ring 24 retains the axle 8 in the first gear case 14.

As seen from FIG. 2, the third bearing 18 is disposed between the axis Y of the transmitting and steering shaft 9 and a line L extending through a center of meshing between the first driving bevel gear 10 and first driven bevel gear 11 and perpendicular to the axle 8.

With the above construction, as shown in FIG. 2, an extension of the axis Y of the transmitting and steering shaft 9 and the centerline Q of the front wheel 1 meet substantially at the same point of intersection with the ground, thus realizing so-called zero scrub radius (or approximately zero scrub radius). This is achieved without increasing the angle of inclination of the transmitting and steering shaft 9 (kingpin angle) from what it is in the prior art. Consequently, an increased steering angle is realized while requiring the same space as in the prior art for steering the front wheel 1.

Figure 3:
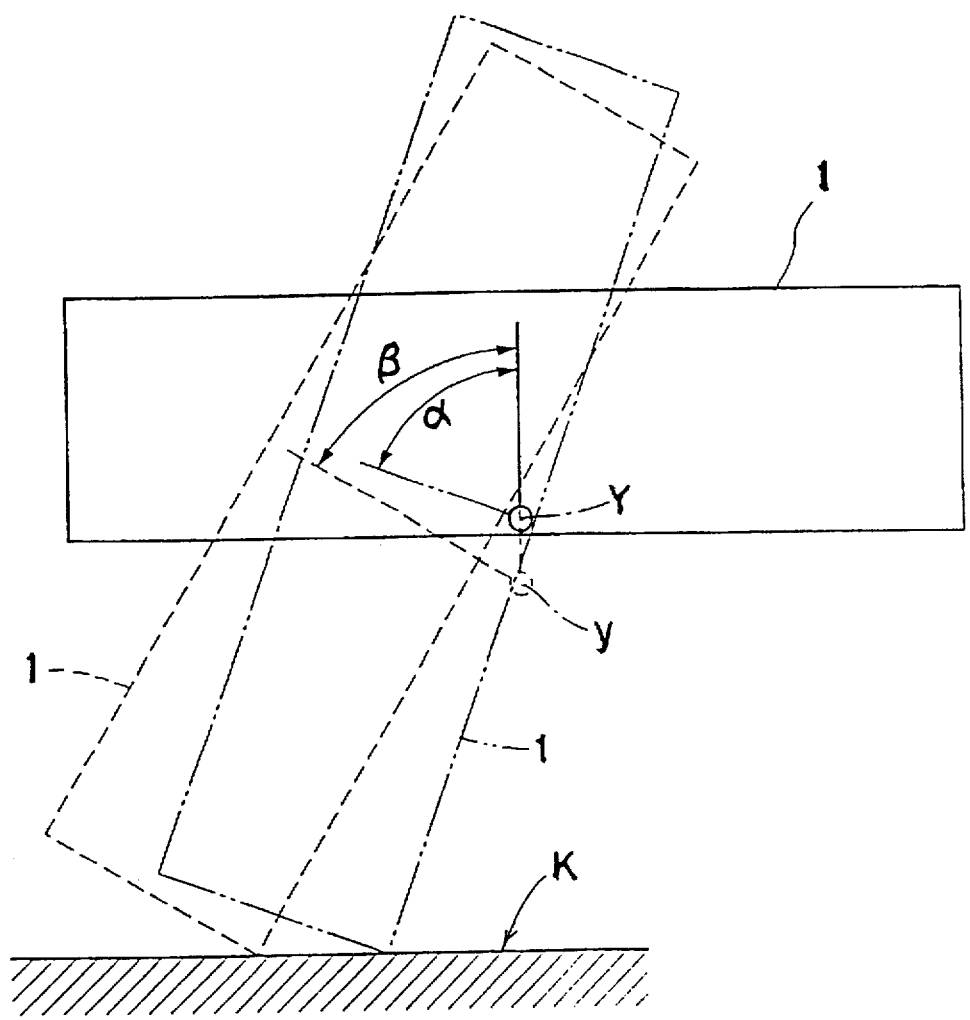
FIG. 3 is an explanatory view showing a comparison in maximum steering angle between the dirigible drive wheels according to the present invention and those in the prior art.

For reference, FIG. 3 schematically shows a comparison in maximum steering angle between the construction according to the present invention and a prior art construction. In the prior art, the center of steering y is a little spaced from a front wheel 1 inwardly of the tractor body. The prior art construction provides maximum steering angle b of 60 degrees when the front wheel 1 is steered to a maximum permissible line K out of contact with a motor section. In the present invention, the center of steering Y is closer to the front wheel 1 than in the prior art. This construction provides maximum steering angle a of 70 degrees when the front wheel 1 is steered to the maximum permissible line K. Thus, the present invention provides a steering angle about 10 degrees larger than in the prior art.

What is claimed is:

1. A dirigible drive wheel assembly for receiving drive from a transmission shaft, comprising:

an axle connected to a wheel at an end of said axle;

drive transmission means for drivably connecting said axle to said transmission shaft, said drive transmission means including:

a transmitting and steering shaft extending approximately vertically with an axis thereof inclined;

a first driving gear disposed in a lower end region of said transmitting and steering shaft, and a first driven gear mounted on said axle and meshed with said first driving gear; and a second driven gear disposed in an upper end region of said transmitting and steering shaft, and a second driving gear mounted on said transmission shaft and meshed with said second driven gear;

a first gear case for covering said first driven gear and said first driving gear, said first gear case having a lower end;

a second gear case for covering said second driven gear and said second driving gear;

a first bearing mounted on said first gear case and on said lower end of said second gear case through which said second gear case is supported to be rotatable about said axis;

an arm extending from said first gear case for holding an upper end of said second gear case to be rotatable about said axis;

a second bearing and a third bearing arranged at opposite sides of said first driven gear, at respective positions near and away from said axle end, through which said first gear case is rotatably supported by said axle;

wherein said third bearing is located below a plane which is perpendicular to said transmitting and steering shaft axis and which extends through said first bearing.

2. A dirigible drive wheel assembly as defined in claim 1, wherein said third bearing is located between said transmitting and steering shaft and a line extending through a center of meshing between said first driven gear and said first driving gear and perpendicular to said axle.

3. A dirigible drive wheel assembly as defined in claim 1, wherein said second driven gear is mounted on said transmitting and steering shaft to mesh with a lower position of said second driving gear.

4. A dirigible drive wheel assembly as defined in claim 1, wherein said first gear case defines an opening for receiving a lower end of said second gear case, said lower end of said second gear case being located above an axis of said axle, said first gear case defining a space therein for receiving a large part of said transmitting and steering shaft and said first driving gear.

5. A dirigible drive wheel assembly as defined in claim 1, wherein said axle is attachable by insertion from outside said wheel through said second bearing to said third bearing, said axle being retained in place by a snap ring interposed between said first driven gear and said axle.

* * * * *